(12) United States Patent
Ichihashi et al.

(10) Patent No.: US 9,057,446 B2
(45) Date of Patent: Jun. 16, 2015

(54) PRESSURE CONTROL APPARATUS

(71) Applicants: DENSO CORPORATION, Kariya, Aichi-pref. (JP); NIPPON SOKEN, INC., Nishio, Aichi-pref. (JP)

(72) Inventors: Katsuhiro Ichihashi, Okazaki (JP); Yoshiharu Nonoyama, Nagoya (JP); Fumiaki Arikawa, Okazaki (JP); Hiroyasu Kanamori, Nagoya (JP)

(73) Assignees: DENSO CORPORATION, Kariya (JP); NIPPON SOKEN, INC., Nishio (JP)

( * ) Notice: Subject to any disclaimer, the term of this patent is extended or adjusted under 35 U.S.C. 154(b) by 112 days.

(21) Appl. No.: 13/729,497

(22) Filed: Dec. 28, 2012

(65) Prior Publication Data

US 2013/0168581 A1 Jul. 4, 2013

(30) Foreign Application Priority Data

Dec. 28, 2011 (JP) .................. 2011-289023

(51) Int. Cl.
*F16K 31/06* (2006.01)
*F16K 17/00* (2006.01)

(52) U.S. Cl.
CPC ............. *F16K 17/00* (2013.01); *F16K 31/0693* (2013.01); *F16K 31/0665* (2013.01); *F16K 31/0686* (2013.01)

(58) Field of Classification Search
CPC ............ F16K 31/0655; F16K 31/0658; F16K 31/0662; F16K 31/0665; F16K 31/0668; F16K 31/0686; F16K 31/0693
USPC .................. 251/129.02, 129.07, 129.15, 282; 303/119.2

See application file for complete search history.

(56) References Cited

U.S. PATENT DOCUMENTS

| | | | | |
|---|---|---|---|---|
| 4,592,533 A | * | 6/1986 | Guglielmi et al. | .......... 251/30.01 |
| 5,167,442 A | * | 12/1992 | Alaze et al. | .............. 303/113.2 |
| 5,351,935 A | | 10/1994 | Miyoshi et al. | |
| 5,401,087 A | * | 3/1995 | Goossens | ................ 303/119.2 |
| 5,423,602 A | * | 6/1995 | Takahashi | ................ 303/119.2 |
| 5,603,483 A | * | 2/1997 | Reuter et al. | ............. 251/129.02 |
| 6,213,445 B1 | * | 4/2001 | Sato et al. | ....................... 251/48 |

(Continued)

FOREIGN PATENT DOCUMENTS

| | | |
|---|---|---|
| JP | 53-090229 | 7/1978 |
| JP | 61-029177 | 2/1986 |
| JP | 04-062973 | 5/1992 |

OTHER PUBLICATIONS

Office Action (3 pages) dated Mar. 4, 2014, issued in corresponding Japanese Application No. 2011-289023 and English translation (5 pages).

*Primary Examiner* — Matthew W Jellett
(74) *Attorney, Agent, or Firm* — Nixon & Vanderhye P.C.

(57) ABSTRACT

A first resilient member generates a resilient force to urge a valve portion in a valve-closing direction. A second resilient member generates a resilient force against the resilient force of the first resilient member. The resilient force of the first resilient member and the resilient force of the second resilient member are set to be balanced with each other when the valve portion is placed in a lift position that is between a full-closing position of the valve portion, in which the valve portion is seated against a valve seat to fully close a fluid passage, and a full-opening position of the valve portion, in which the valve portion is fully lifted away from the valve seat to fully open the fluid passage.

8 Claims, 7 Drawing Sheets

(56) References Cited

U.S. PATENT DOCUMENTS

| | | |
|---|---|---|
| 6,279,873 B1 | 8/2001 | Eichendorf et al. |
| 6,659,421 B1 * | 12/2003 | Goossens ................. 251/129.02 |
| 6,755,390 B2 * | 6/2004 | Masuda et al. ............. 251/30.03 |
| 6,866,242 B2 * | 3/2005 | Hirota ...................... 251/129.07 |
| 6,938,591 B2 * | 9/2005 | Fuwa et al. ................. 123/90.11 |
| 7,578,494 B2 * | 8/2009 | Mitsumata et al. ...... 251/129.15 |
| 8,328,157 B2 * | 12/2012 | Schulz et al. ............ 251/129.15 |
| 2011/0127357 A1 | 6/2011 | Leister et al. |

* cited by examiner

PRESSURE CONTROL APPARATUS

CROSS REFERENCE TO RELATED APPLICATION

This application is based on and incorporates herein by reference Japanese Patent Application No. 2011-289023 filed on Dec. 28, 2011.

TECHNICAL FIELD

The present disclosure relates to a pressure control apparatus.

BACKGROUND

A previously known pressure control apparatus changes a cross-sectional area of a fluid passage between a valve portion and a valve seat through relative movement of the valve portion relative to the valve seat. An armature and a rod are driven by a magnetic pulling force (also referred to as a magnetic attracting force) of a pulling force generating device, which magnetically pulls the armature along with the rod toward a body (or a yoke) of the pressure control apparatus in a valve-closing direction upon energization of a coil of the pulling force generating device. Thus, the valve portion is urged in the valve-closing direction through the armature and the rod. Furthermore, the valve portion is urged in the valve-opening direction by a fluid force and a resilient urging force of a spring (see, for example, US 2011/0127357A1).

However, when the fluid force is increased to increase the amount of lift of the valve portion from the valve seat, an air gap between the body (or the yoke) of the pressure control apparatus and the armature is increased to result in a decrease in the magnetic pulling force. Thereby, even when the fluid pressure is controlled and is thereby reduced, the valve portion does not easily move in the valve-closing direction. As a result, the fluid pressure is substantially reduced to result in an increase in the amount of change in the fluid pressure, and thereby the pressure controllability of the pressure control apparatus is deteriorated.

Furthermore, the valve portion is urged in the valve-opening direction by the spring. Therefore, in order to balance the forces, the corresponding magnetic pulling force, which corresponds to the amount of the spring force, is required besides the fluid force. Thus, a size of the coil of the pulling force generating device is disadvantageously increased, and thereby the size of the pressure control apparatus is disadvantageously increased.

The present disclosure addresses the above disadvantages. According to the present disclosure, there is provided a pressure control apparatus, which includes a body, a valve portion, a pulling force generating device, a first resilient member and a second resilient member. The body forms a fluid passage, which conducts fluid, and a valve seat, which is located in the fluid passage. The valve portion is displaceable relative to the valve seat in both of a valve-opening direction, which is away from the valve seat, and a valve-closing direction, which is toward the valve seat, to change a cross-sectional area of the fluid passage at a location between the valve seat and the valve portion. The valve portion is urged in the valve-opening direction by the fluid located on an upstream side of the valve portion in the fluid passage. The pulling force generating device generates a pulling force to urge the valve portion in the valve-closing direction. The pulling force of the pulling force generating device is adjustable to control a pressure of the fluid in the fluid passage. The first resilient member generates a resilient force to urge the valve portion in the valve-closing direction. The second resilient member generates a resilient force against the resilient force of the first resilient member. The resilient force of the first resilient member and the resilient force of the second resilient member are set to be balanced with each other when the valve portion is placed in a lift position that is between a full-closing position of the valve portion, in which the valve portion is seated against the valve seat to fully close the fluid passage, and a full-opening position of the valve portion, in which the valve portion is fully lifted away from the valve seat to fully open the fluid passage.

BRIEF DESCRIPTION OF THE DRAWINGS

The drawings described herein are for illustration purposes only and are not intended to limit the scope of the present disclosure in any way.

DETAILED DESCRIPTION

Figure 1:
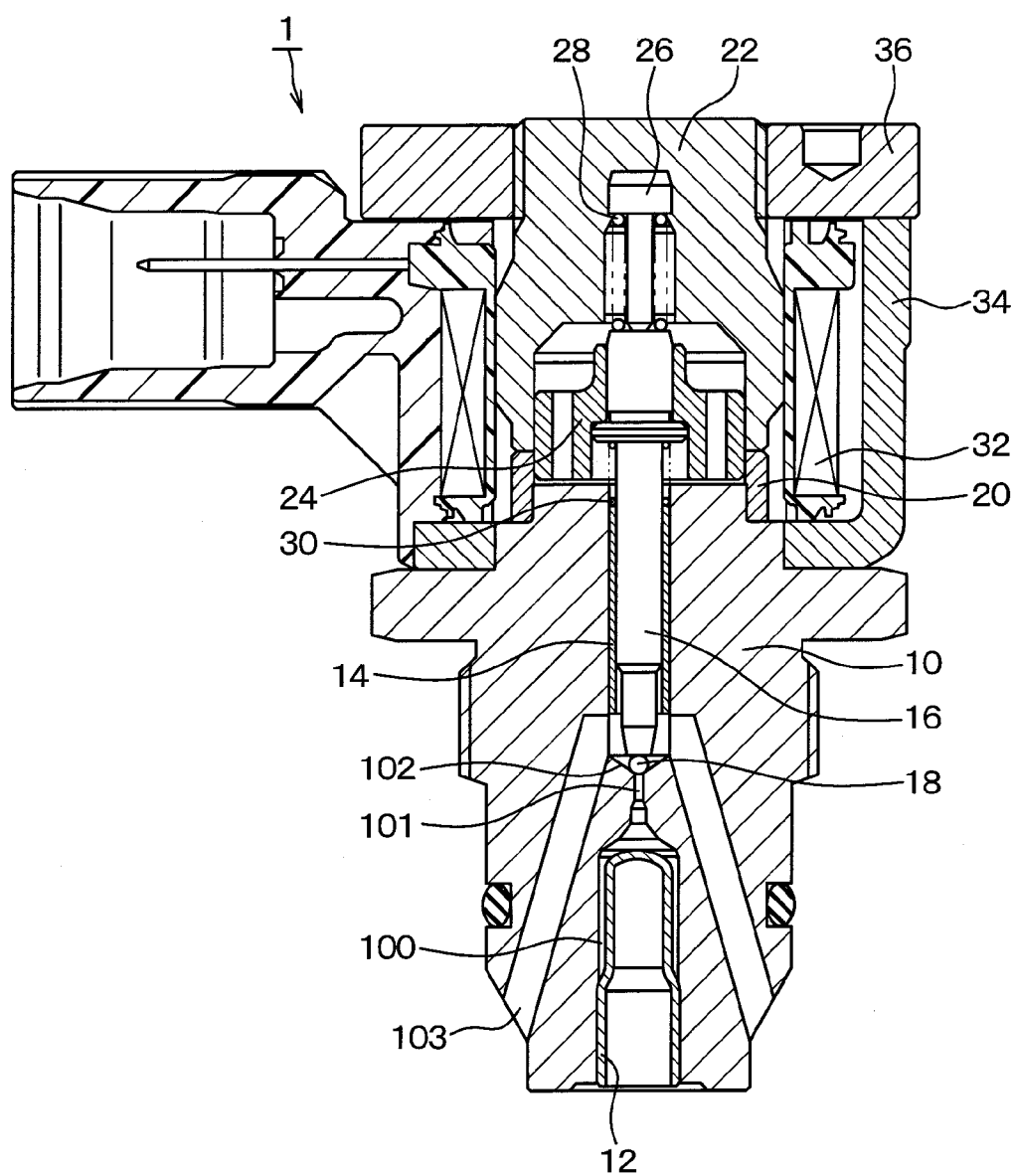
FIG. 1 is a cross-sectional view of a pressure control apparatus according to a first embodiment of the present disclosure.

Various embodiments of the present disclosure will be described with reference to the accompanying drawings. In each of the following embodiments, similar components are indicated by the same reference numerals.

First Embodiment

Figure 2A:
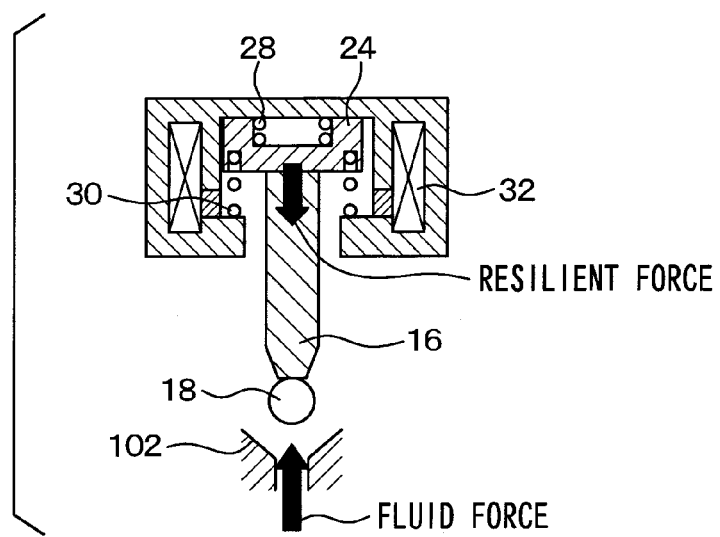
FIGS. 2A to 2C are schematic cross-sectional views showing various operational states of the pressure control apparatus of the first embodiment.
Figure 2B:
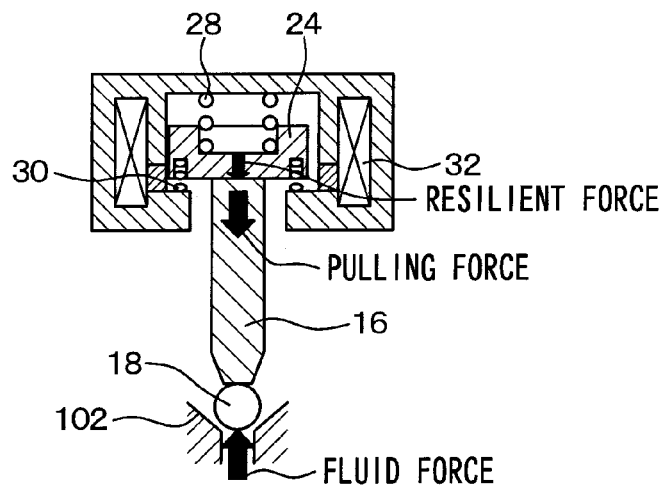
Figure 2C:
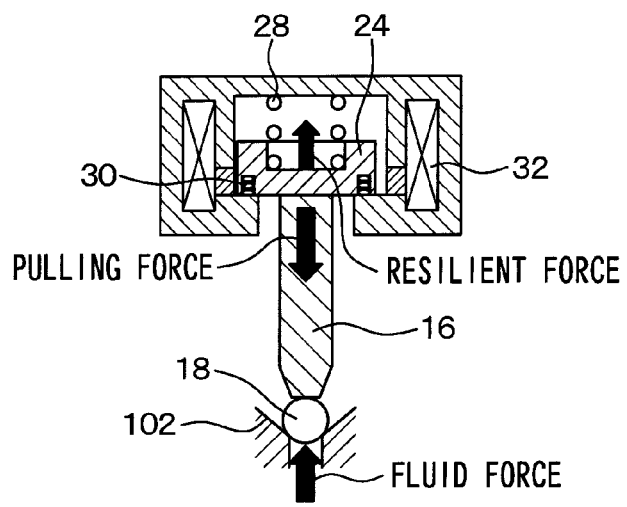

A first embodiment of the present disclosure will be described. FIG. 1 is a cross-sectional view of a pressure control apparatus 1 of the first embodiment. FIGS. 2A to 2C are schematic cross-sectional views showing various operational states of the pressure control apparatus 1.

The pressure control apparatus 1 of the present embodiment is used as a pressure control apparatus that controls a pressure of fuel in a common rail in a fuel injection system of an internal combustion engine of a vehicle (e.g., an automobile).

As shown in FIG. 1, an inlet fluid passage 100, through which fluid (fuel in this embodiment) is supplied into the pressure control apparatus 1, is formed in a body 10 that is made of magnetic metal and is configured into a generally cylindrical tubular form. The inlet fluid passage 100 extends generally parallel to an axis of the body 10 at a radial center of the body 10. A porous filter 12, which filters foreign objects contained in the fluid, is placed in the inlet fluid passage 100. A choked fluid passage 101, which has a cross-sectional area that is smaller than a cross-sectional area of the inlet fluid passage 100, is formed in the body 10 on a downstream side of the inlet fluid passage 100. A valve seat 102 is formed in a downstream end portion of the choked fluid passage 101 such that the valve seat 102 is configured into a conical form and surrounds an opening of the choked fluid passage 101. Outlet fluid passages 103, through which the fluid is outputted from the pressure control apparatus 1, are formed on the downstream side of the choked fluid passage 101 in the body 10 at corresponding locations that are radially displaced away from the radial center of the body 10. Here, it should be noted that the inlet fluid passage 100, the choked fluid passage 101 and the outlet fluid passages 103 may collectively serve as a fluid passage of the body 10 of the pressure control apparatus 1.

A sleeve 14, which is made of metal and is configured into a cylindrical tubular form, is inserted into a through-hole that extends through the radial center of the body 10. More specifically, the sleeve 14 is press-fitted into the through-hole of the body 10 and is thereby fixed to the body 10. A rod 16, which is made of metal and is configured into a generally cylindrical body, is slidably held by the sleeve 14 in an inside of the sleeve 14. One end surface of the rod 16 is a planar surface that extends generally perpendicular to an axis of the rod 16 and is axially opposed to the valve seat 102.

A valve portion 18, which is made of metal and is configured into a spherical body, is placed between the one end surface of the rod 16 and the valve seat 102. The valve portion 18 is displaceable relative to the valve seat 102 in both of a valve-opening direction, which is away from the valve seat 102, and a valve-closing direction, which is toward the valve seat 102, to change a cross-sectional area of the fluid passage at a location between the valve seat 102 and the valve portion 18. The valve portion 18 is urged in the valve-opening direction by a fluid force of the fluid, which is supplied from the choked fluid passage 101 side, i.e., which is located on an upstream side of the valve portion 18.

A stator core 22, which is made of magnetic metal and is configured into a cup-shaped form, is connected to an axial end portion of the body 10 through a collar 20, which is made of non-magnetic metal and is configured into a cylindrical tubular body.

An armature 24, which is made of magnetic metal and is configured into a generally cylindrical tubular form, is placed in a space that is formed by the body 10, the collar 20 and the stator core 22. The other end portion of the rod 16, which is axially opposite from the valve seat 102, is securely press fitted into a through-hole of the armature 24, which axially extends through a radial center of the armature 24. Thereby, the armature 24 and the rod 16 are integrally displaceable, i.e., are integrally movable.

A stopper 26, which is made of metal and is configured into a generally cylindrical body, is inserted into a hole, which is formed in a bottom portion of the stator core 22. The stopper 26 limits an axial movable range of the rod 16 in the direction away from the valve seat 102 (i.e., the valve-opening direction).

A first resilient member 28 is clamped between the stopper 26 and the rod 16. The first resilient member 28 exerts a resilient force to urge the valve portion 18 in the valve-closing direction through the rod 16. In the present embodiment, the first resilient member 28 is made of a compression coil spring.

A second resilient member 30 is clamped between the sleeve 14 and the rod 16. The second resilient member 30 exerts a resilient force to urge the rod 16 in the direction away from the valve seat 102. In other words, the second resilient member 30 exerts the resilient force against the resilient force of the first resilient member 28. In the present embodiment, the second resilient member 30 is made of a compression coil spring.

A coil 32, which is configured into a generally cylindrical tubular form and forms a magnetic field upon energization thereof, is placed on a radially outer side of the stator core 22. A yoke 34, which is made of magnetic metal, covers an outer peripheral portion of the coil 32.

A retainer 36, which is made of magnetic metal and is configured into a cylindrical tubular form, is threadably engaged with an outer peripheral part of the bottom portion of the stator core 22. The yoke 34 is clamped between the retainer 36 and the body 10, and the coil 32 is clamped between the retainer 36 and the yoke 34.

The body 10, the stator core 22, the armature 24, the yoke 34 and the retainer 36 form a magnetic circuit when the coil 32 is energized. When the coil 32 is energized, a magnetic pulling force (a magnetic attracting force), which is also simply referred to as a pulling force, is generated to pull and thereby to urge the armature 24 and the rod 16 toward the valve seat 102 (i.e., in the valve-closing direction).

Figure 3A:
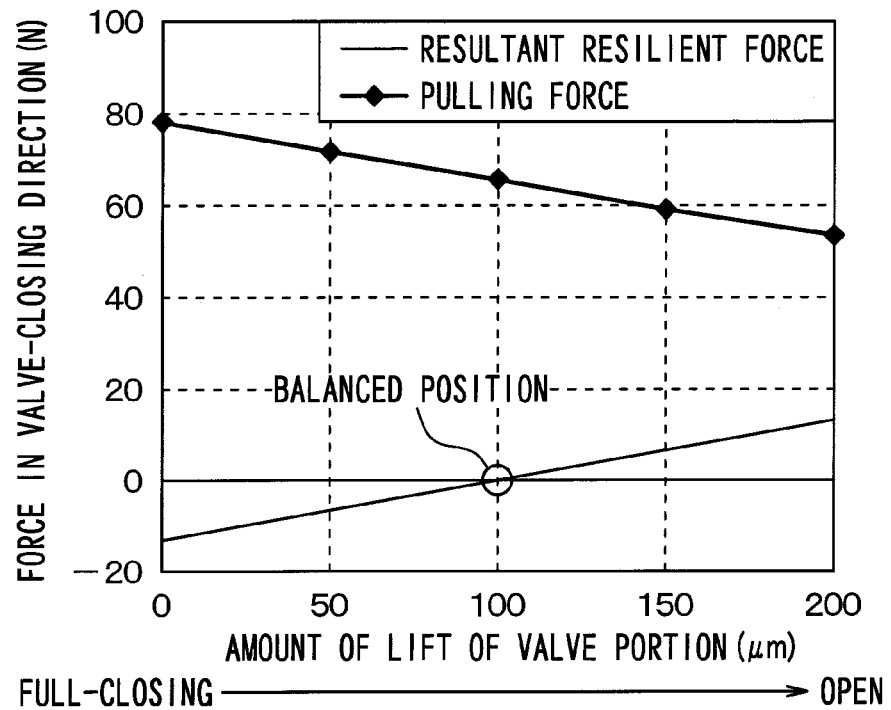
FIG. 3A is a characteristic diagram showing a relationship of a magnetic pulling force and a resultant resilient force relative to the amount of lift of a valve portion of the pressure control apparatus of the first embodiment.
Figure 3B:
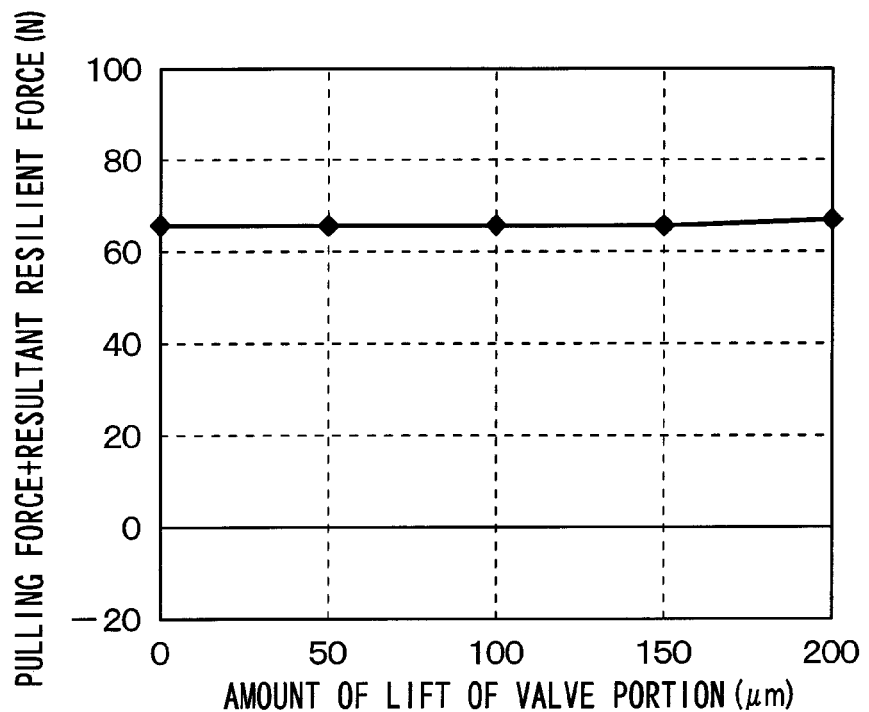
FIG. 3B is a characteristic diagram showing a relationship of a resultant force of the magnetic pulling force and the resultant resilient force relative to the amount of lift of the valve portion of the pressure control apparatus of the first embodiment.

FIG. 3A is a characteristic diagram showing a relationship between the magnetic pulling force and the amount of lift of the valve portion 18. FIG. 3A also shows a relationship between a resultant force (hereinafter referred to as a resultant resilient force) of the resilient force of the first resilient member 28 and the resilient force of the second resilient member 30 and the amount of lift of the valve portion 18. FIG. 3B is a characteristic diagram showing a relationship between a resultant force of the magnetic pulling force and the resultant resilient force and the amount of lift of the valve portion 18. In FIGS. 3A and 3B, the force exerted in the valve-closing direction is indicated with a plus sign (+), and the force exerted in the valve-opening direction is indicated with a minus sign (−).

As shown in FIG. 3A, when the amount of lift of the valve portion 18 from the valve seat 102 is increased, an air gap between the magnetic pole surfaces (the surface of the body 10 and the surface of the armature 24, which are opposed to each other) is increased. Therefore, the magnetic pulling force (i.e., the force in the valve-closing direction) under a predetermined condition, in which the electric current supplied to the coil 32 is constant, is reduced in response to an increase in the amount of lift of the valve portion 18.

Furthermore, when the valve portion 18 is placed in a lift position (also referred to as a corresponding lift position) between a full-closing position of the valve portion 18, in which the valve portion 18 is seated against the valve seat 102 to fully close the fluid passage, and a full-opening position of the valve portion 18, in which the valve portion 18 is fully lifted away from the valve seat 102 to fully open the fluid passage, the resilient force of the first resilient member 28 and the resilient force of the second resilient member 30 are balanced with each other. Therefore, the pressure control apparatus 1 of the present embodiment is formed as a normally open pressure control apparatus (also referred to as a normally open type pressure control apparatus). The resilient force of the first resilient member 28 and the resilient force of the second resilient member 30 are balanced with each other at the corresponding lift position of the valve portion 18 (the lift position of the valve portion 18, at which the amount of lift of the valve portion 18 from the valve seat 102 is 100 μm in this embodiment), and this corresponding lift position of the valve portion 18 will be hereinafter referred to as a resilient-force-balanced position (or simply referred to as a balanced position).

In a range where the amount of lift of the valve portion 18 is larger than the resilient-force-balanced position (i.e., the amount of lift of the valve portion 18 at the resilient-force-balanced position), the resultant resilient force is exerted in the valve-closing direction. Furthermore, in a range where the amount of lift of the valve portion is smaller than the resilient-force-balanced position (i.e., the amount of lift of the valve portion 18 at the resilient-force-balanced position), the resultant resilient force is exerted in the valve-opening direction. The resultant resilient force in the valve-closing direction is increased when the amount of lift of the valve portion 18 is increased.

Furthermore, the amount of change in the magnetic pulling force, which is generated in response to a predetermined amount of change in the amount of lift of the valve portion 18, is set to be generally the same as the amount of change in the resultant resilient force, which is generated in response to the predetermined amount of change in the amount of lift of the valve portion 18. Thereby, as shown in FIG. 3B, the resultant force of the magnetic pulling force and the resultant resilient force (i.e., the magnetic pulling force+the resultant resilient force) is generally constant throughout the entire lift range of the valve portion 18.

The operation of the pressure control apparatus 1, which is constructed in the above described manner, will now be described. First of all, in the non-energized state of the coil 32, in which the electric current is not supplied to the coil 32, the valve portion 18 receives the fluid force of the fluid supplied from the inlet fluid passage 100 and is thereby displaced to a valve-opening side position, which is located on the valve-opening side of the resilient-force-balanced position (see FIG. 2A). In this state, since the valve portion 18 is displaced on the valve opening side of the resilient-force-balanced position, the resultant resilient force is exerted in the valve-closing direction.

When the magnetic pulling force is generated through the energization of the coil 32, the valve portion 18 is urged in the valve-closing direction by the resultant resilient force and the magnetic pulling force. When the resultant force of the resultant resilient force and the magnetic pulling force becomes larger than the fluid force, the valve portion 18 is displaced in the valve-closing direction (see FIG. 2B). Thereby, the cross-sectional area of the fluid passage between the valve portion 18 and the valve seat 102 is reduced to result in an increase in the fluid pressure. Then, when the fluid force becomes larger than the resultant force of the resultant resilient force and the magnetic pulling force in response to the increase in the fluid pressure, the valve portion 18 is displaced in the valve-opening direction to result in a decrease in the fluid pressure in the fluid passage. As discussed above, the fluid pressure is controlled to the pressure that corresponds to the electric current supplied to the coil 32 (in other words, the pressure that corresponds to the magnetic pulling force).

When the magnetic pulling force is increased by increasing the amount of electric power supplied to the coil 32, the valve portion 18 is further displaced in the valve-closing direction. Thereby, the fluid pressure is controlled to the higher pressure. Then, when the valve portion 18 is displaced to a valve-closing-side position, which is located on the valve closing side of the resilient-force-balanced position (see FIG. 2C), the resultant resilient force is exerted in the valve-opening direction.

In this state, when the energization of the coil 32 and the supply of the fluid are both stopped, the magnetic pulling force is not applied to the valve portion 18, and the fluid force (pressure) of the fuel remaining in the common rail is exerted. Thereby, the armature 24 and the rod 16 are driven in the valve-opening direction by the resultant resilient force and the fluid force of the remaining fuel, and the valve portion 18 is freed from the magnetic pulling force in the location between the full-closing position of the valve portion 18 and the resilient-force-balanced position. Thus, the pressure control apparatus 1 is placed in the valve-opening state.

In the present embodiment, when the valve portion 18 is displaced to a location adjacent to the full-closing position, the valve portion 18 is urged by the resultant resilient force toward the resilient-force-balanced position. Thereby, the valve portion 18 can be quickly moved from the location, which is adjacent to the full-opening position, to the resilient-force-balanced position side. In this way, the variable range of the fluid pressure in the pressure control apparatus 1 is reduced, and thereby the pressure controllability of the pressure control apparatus 1 is improved.

In the present embodiment, the coil 32 alone or in corporation with the body 10, the stator core 22, the yoke 34 and the retainer 36 may serve as a pulling force generating device (also referred to as a solenoid device) of the present disclosure that generates the magnetic pulling force to pull the armature 24 toward the body 10 to exert (generate) an urging force to urge the valve portion 18 through the armature 24 and the rod 16 in the valve-closing direction toward the valve seat 102 upon energization of the coil 32. The valve portion 18 is urged in the valve-closing direction by the magnetic pulling force of the pulling force generating device and the resilient force of the first resilient member 28. Therefore, the magnetic pulling force of the pulling force generating device can be reduced by the amount, which corresponds to the amount of the resilient force of the first resilient member 28. In this way, it is possible to reduce the size of the pulling force generating device and thereby the size of the pressure control apparatus 1 (20% reduction in the outer diameter of the pressure control apparatus 1 in comparison to the outer diameter of the previously proposed pressure control apparatus).

Furthermore, the sleeve 14 is fixed to the body 10, in which the valve seat 102 is formed. Therefore, the coaxiality between the valve seat 102 and the rod 16 can be improved in comparison to a case where the portion, which forms the valve seat 102, and the portion, to which the sleeve 14 is fixed, are formed separately.

Figure 4:
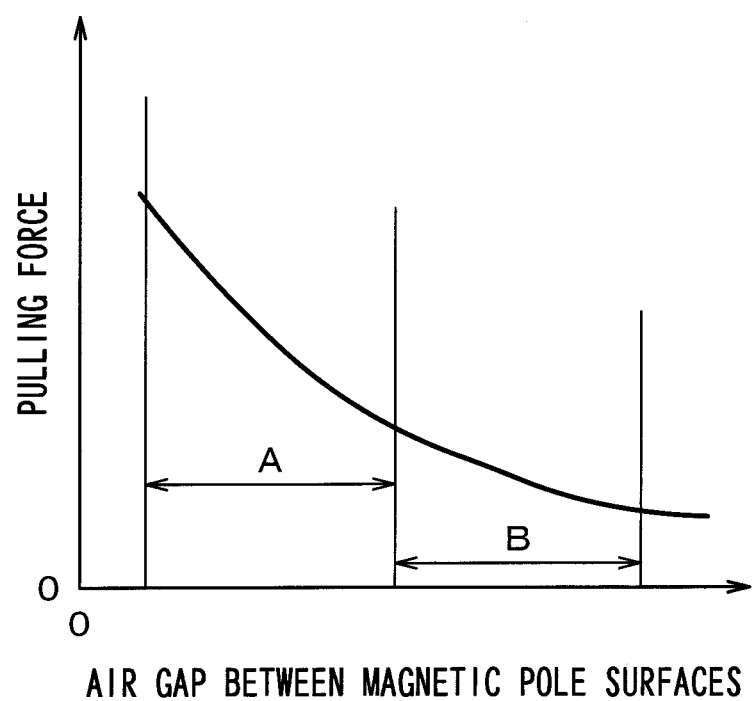
FIG. 4 is a characteristic diagram showing a relationship between a size of an air gap and the magnetic pulling force according to the first embodiment.

FIG. 4 is a characteristic diagram showing a relationship between the air gap, which is a gap between the magnetic pole surfaces (the surface of the body 10 and the surface of the armature 24, which are opposed to each other), and the magnetic pulling force. As shown in FIG. 4, the amount of change in the magnetic pulling force relative to the amount of change in the size of the air gap (i.e., the amount of change in the displacement of the armature 24) is smaller in a second range B, in which the air gap is large (e.g., a final air gap is equal to or larger than 150 μm) in comparison to a first range A, in which the air gap is small.

Here, the inventors of the present application have prepared a pressure control apparatus (hereinafter, referred to as an evaluation product A), which uses the first range A, and a pressure control apparatus (hereinafter, referred to as an evaluation product B), which uses the second range B, and have examined these pressure control apparatuses (the evaluation products A, B) with respect to the relationship between the electric current supplied to the coil 32 and the common rail pressure.

Figure 5A:
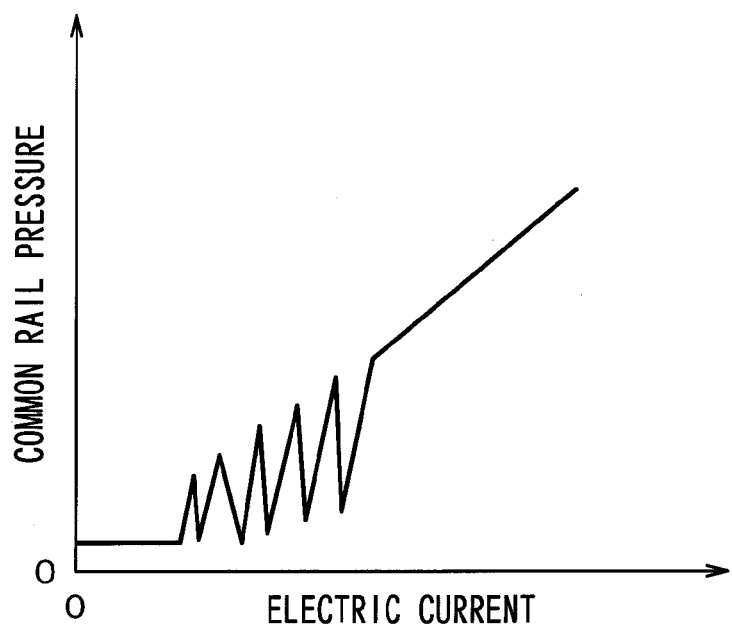
FIG. 5A is a diagram showing a test result of an evaluation product A.
Figure 5B:
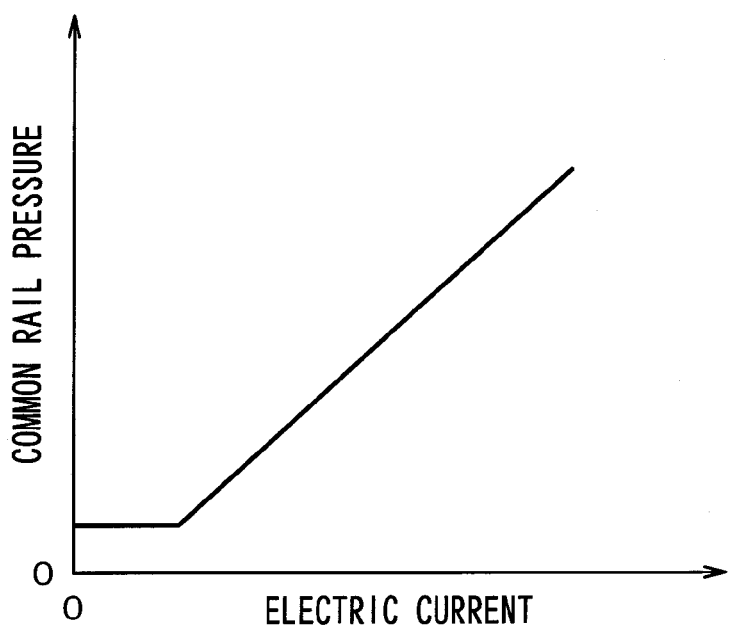
FIG. 5B is a diagram showing a test result of an evaluation product B.

FIG. 5A shows a test result of the evaluation product A, and FIG. 5B shows a test result of the evaluation product B. As is understood from FIGS. 5A and 5B, the evaluation product B shows a generally linear relationship between the electric current value and the common rail pressure in a range, which is larger than a predetermined electric current value, thereby resulting in the good pressure controllability.

Second Embodiment

Figure 6:
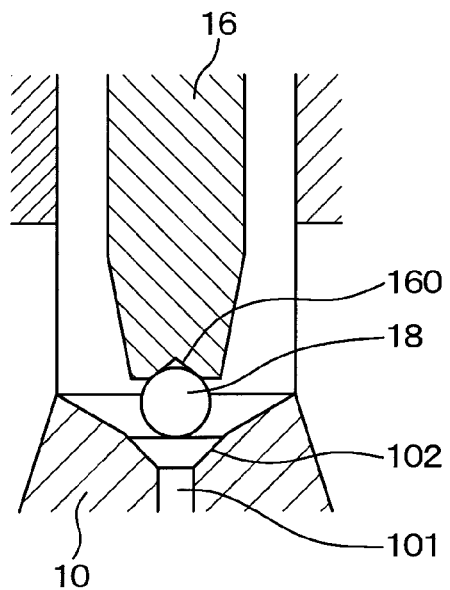
FIG. 6 is a cross-sectional view showing a main feature of a pressure control apparatus according to a second embodiment of the present disclosure.

A second embodiment of the present disclosure will be described. FIG. 6 is a partial enlarged cross-sectional view of a pressure control apparatus 1 according to the second embodiment of the present disclosure. In the following description, the second embodiment will be described only with respect to differences, which are different from the first embodiment.

In the case where the end surface of the rod 16, which is axially located on the valve portion 18 side, is planar like in the first embodiment, the position of the valve portion 18 may possibly become unstable. According to the result of the experiment conducted by the inventors of the present disclosure, since the position of the valve portion 18 is not fixed, the valve portion 18 may be placed in the radial center of the rod 16 or may be placed at a location that is radially displaced from the radial center of the rod 16. Thereby, the pressure regulating accuracy of the pressure control apparatus may possibly be reduced.

Furthermore, like in the first embodiment, in the case where the end surface of the rod 16, which is axially located on the valve portion 18 side, is the planar surface, the valve portion 18 and the rod 16 make a point-to-point contact therebetween. Therefore, a contact pressure at the contact surface between the valve portion 18 and the rod 16 becomes high, so that the contact surface between the valve portion 18 and the rod 16 may be easily plastically deformed.

In the pressure control apparatus 1 of the second embodiment, as shown in FIG. 6, a recess 160, which is configured into a conical form, is formed (axially recessed) in the one end surface of the rod 16 at the radial center of the rod 16. The valve portion 18 is urged toward the rod 16 by the fluid force, so that a portion of the valve portion 18 is received in the recess 160. Thus, the valve portion 18 is positioned in the radial center of the rod 16. As a result, the valve portion 18 can be always placed coaxial relative to the valve seat 102. Thereby, the pressure controllability of the pressure control apparatus 1 can be further improved.

Furthermore, in the second embodiment, the valve portion 18 and the rod 16 make a line-to-line contact therebetween, so that a contact pressure at the contact surface between the valve portion 18 and the rod 16, is reduced to limit the plastic deformation of the contact surface between the valve portion 18 and the rod 16. As a result, the stable operation of the pressure control apparatus 1 can be possible without resulting in a substantial change (deformation) in the contact surface between the valve portion 18 and the rod 16 with time.

Third Embodiment

Figure 7:
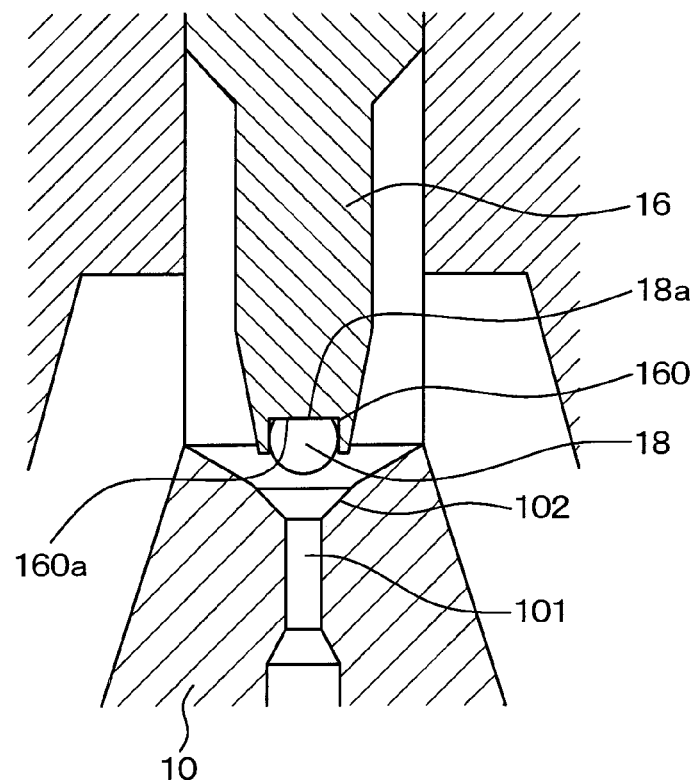
FIG. 7 is a cross-sectional view showing a main feature of a pressure control apparatus according to a third embodiment of the present disclosure.

A third embodiment of the present disclosure will be described. FIG. 7 is a partial enlarged cross-sectional view showing a main feature of a pressure control apparatus 1 according to the third embodiment of the present disclosure. In the following description, the third embodiment will be described only with respect to differences, which are different from the first embodiment.

As shown in FIG. 7, a recess 160, which is configured into a cylindrical form, is formed (axially recessed) in the one end surface of the rod 16 at the radial center of the rod 16. A bottom surface 160a of the recess 160 is a planar surface that extends in a direction perpendicular to the axis of the rod 16, and the bottom surface 160a of the recess 160 is axially opposed to the valve seat 102.

In the third embodiment, the valve portion 18 is configured into a truncated-spherical body that has a planar surface 18a, which is formed by truncating a portion of a spherical body along a plane that is perpendicular to the axis of the rod 16. The valve portion 18 is received in the recess 160 such that the planar surface 18a of the valve portion 18 contacts the bottom surface 160a of the recess 160.

In the present embodiment, the valve portion 18 is received in the recess 160 and is positioned in the radial center of the rod 16. As a result, the valve portion 18 can be always placed coaxial relative to the valve seat 102. Thereby, the pressure controllability of the pressure control apparatus 1 can be further improved.

Furthermore, the valve portion 18 and the rod 16 make a surface-to-surface contact therebetween, so that a contact pressure at the contact surface between the valve portion 18 and the rod 16 is reduced to limit the plastic deformation of the contact surface between the valve portion 18 and the rod 16. As a result, the stable operation of the pressure control apparatus 1 can be possible without resulting in a substantial change (deformation) in the contact surface between the valve portion 18 and the rod 16 with time.

Fourth Embodiment

Figure 8:
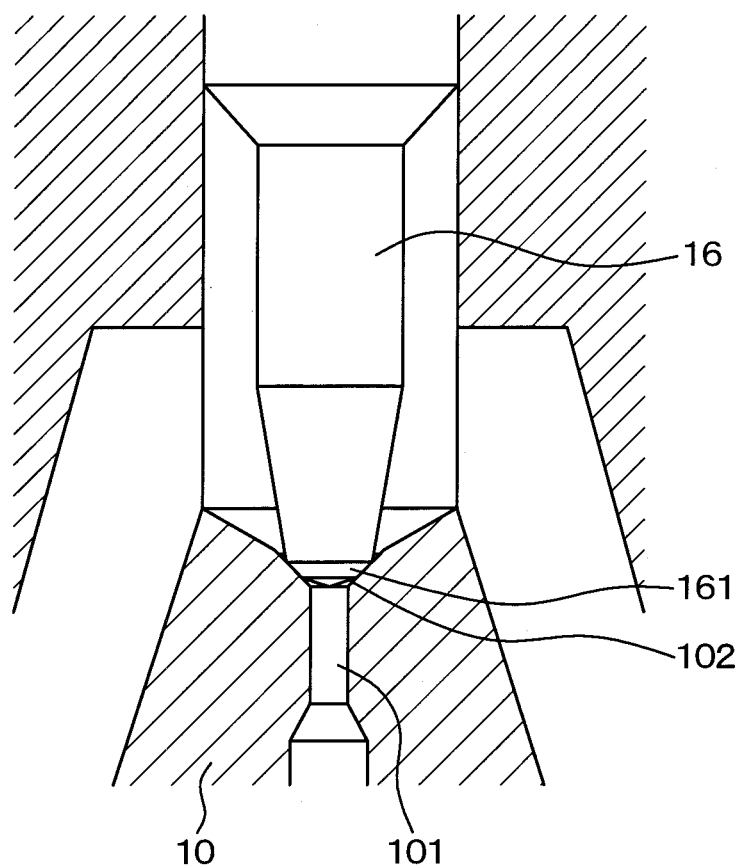
FIG. 8 is a cross-sectional view showing a main feature of a pressure control apparatus according to a fourth embodiment of the present disclosure.

A fourth embodiment of the present disclosure will be described. FIG. 8 is a partial enlarged cross-sectional view of a pressure control apparatus 1 according to the fourth embodiment of the present disclosure. In the following description, the fourth embodiment will be described only with respect to differences, which are different from the first embodiment.

As shown in FIG. 8, in the fourth embodiment, the valve portion 18 (see FIG. 1) of the first embodiment is eliminated, and a seat portion 161, which is configured into a truncated conical form, is formed in the end portion of the rod 16, which is axially located on the valve seat 102 side. When the rod 16 is moved, a cross-sectional area of the fluid passage between the seat portion 161 and the valve seat 102 is changed. The seat portion 161 corresponds to the valve portion of the present disclosure.

With the above construction, the valve portion and the rod are integrated as a single component, and thereby the structure is simplified, and the manufacturing costs is reduced.

Now, modifications of the first to fourth embodiments will be described.

In each of the above embodiments, the present disclosure is applied in the pressure control apparatus 1, which controls the fuel pressure in the common rail. However, the present disclosure can be applied to any other appropriate pressure control apparatus, which controls a pressure of, for example, liquid or gas.

Furthermore, in each of the above embodiments, the inlet fluid passage 100, the choked fluid passage 101, the outlet fluid passages 103 and the valve seat 102 are formed in the single body 10, and the rod 16 is slidably held by the sleeve 14 that is inserted into the body 10. Alternatively, the body 10 may be divided into a plurality of segments. Specifically, for example, the body may be divided into a body segment, in which the inlet fluid passage 100, the choked fluid passage 101, the outlet fluid passages 103 and the valve seat 102 are formed, and another body segment, in which the sleeve 14 is inserted to slidably hold the rod 16.

Furthermore, the component(s) of any one of the above embodiments may be combined with the component(s) of any other one or more of the above embodiments in any appropriate manner within the spirit and scope of the present disclosure.

What is claimed is:

1. A pressure control apparatus comprising:
   a body that forms a fluid passage, which conducts fluid, and a valve seat, which is located in the fluid passage;
   a valve portion that is displaceable relative to the valve seat in both of a valve-opening direction, which is away from the valve seat, and a valve-closing direction, which is toward the valve seat, to change a cross-sectional area of the fluid passage at a location between the valve seat and the valve portion, wherein the valve portion is urged in the valve-opening direction by the fluid located on an upstream side of the valve portion in the fluid passage;
   a pulling force generating device that generates a magnetic pulling force to urge the valve portion in the valve-closing direction through a rod that has one end portion, which is placed adjacent to the valve portion, and another end portion, which is opposite from the one end portion and is held by an armature, wherein:
      the pulling force generating device includes a coil that generates a magnetic field upon energization of the coil to exert the magnetic pulling force from a portion of the body, which is located on one axial side of the armature where the valve seat is placed, and thereby to pull the armature together with the rod toward the portion of the body; and
      the magnetic pulling force of the pulling force generating device is adjustable to control a pressure of the fluid in the fluid passage;
   a first resilient member that generates a first resilient force to urge the valve portion in the valve-closing direction; and
   a second resilient member that generates a second resilient force against the first resilient force of the first resilient member, wherein:
      the first resilient force of the first resilient member and the second resilient force of the second resilient member are set to be balanced with each other when the valve portion is placed in a lift position that is between a full-closing position of the valve portion, in which the valve portion is seated against the valve seat to fully close the fluid passage, and a full-opening position of the valve portion, in which the valve portion is fully lifted away from the valve seat to fully open the fluid passage;
      the magnetic pulling force, which is exerted from the portion of the body to the armature, is reduced in response to an increase in a size of an air gap between the portion of the body and the armature when an amount of lift of the valve portion from the valve seat is increased upon application of a fluid force of the fluid to the valve portion in the valve-opening direction;
      the first resilient force of the first resilient member is increased when the amount of lift of the valve portion from the valve seat is increased upon the application of the fluid force of the fluid to the valve portion; and
      a sum of the magnetic pulling force of the pulling force generating device and a resultant force of the first resilient force of the first resilient member and the second resilient force of the second resilient member is generally constant through an entire lift range of the valve portion.

2. The pressure control apparatus according to claim 1, wherein:
   the resultant force of the first resilient force of the first resilient member and the second resilient force of the second resilient member in the valve-closing direction is increased when the amount of lift of the valve portion from the valve seat is increased.

3. The pressure control apparatus according to claim 1, further comprising:
   a sleeve that is fixed to the body and slidably holds the rod in an inside of the sleeve.

4. The pressure control apparatus according to claim 1, wherein the valve portion is positioned by a recess of the one end portion of the rod that is axially recessed at a radial center of the one end portion of the rod.

5. The pressure control apparatus according to claim 1, wherein the valve portion is configured into a truncated spherical body that has a planar surface, which contacts the one end portion of the rod.

6. The pressure control apparatus according to claim 1, wherein the valve portion is configured into a spherical body.

7. The pressure control apparatus according to claim 1, wherein:
   the rod has the valve portion, which is formed in the one end portion of end portion of the rod; and
   the rod is displaceable integrally with the armature.

8. The pressure control apparatus according to claim 1, wherein:
   the first resilient member is a coil spring; and
   the second resilient member is a coil spring.

* * * * *